Sept. 20, 1955 — E. L. CRABTREE — 2,718,364
FLUID SUSTAINED AND PROPELLED AIRCRAFT
HAVING ANNULAR SHAPED BODY
Filed July 30, 1953 — 3 Sheets-Sheet 1
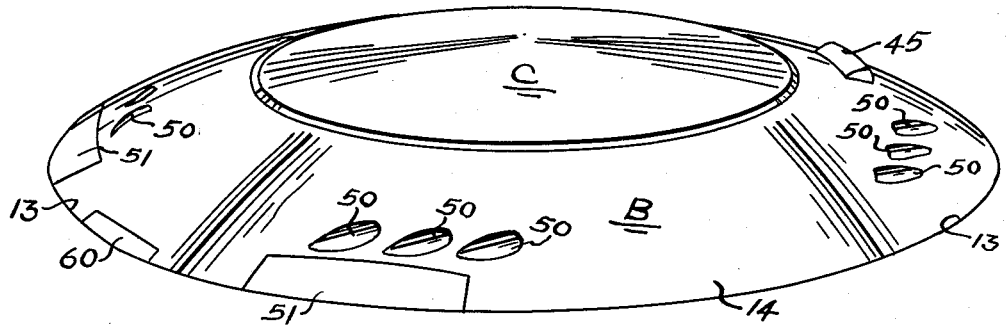
FIG. 1
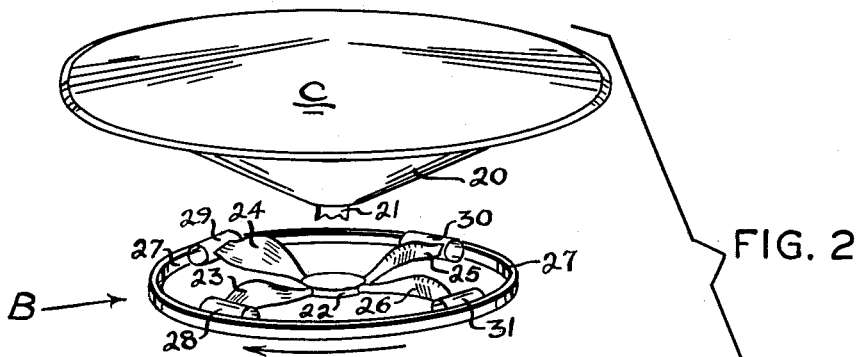
FIG. 2
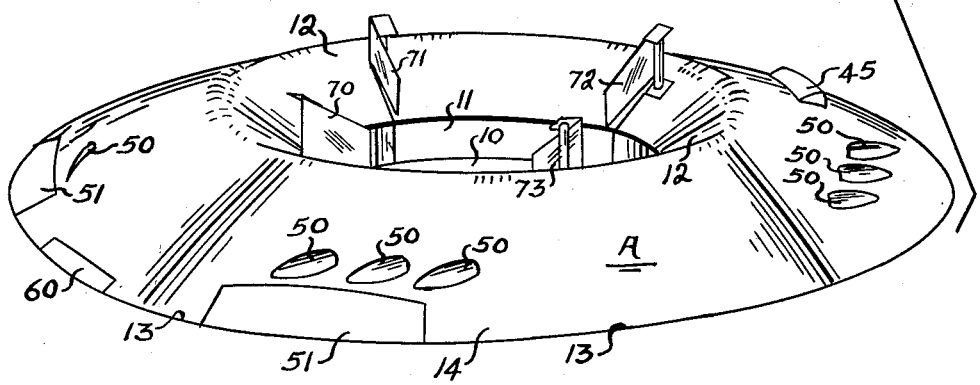
Ernest L. Crabtree
INVENTOR,
BY Bernard P. Miller
ATTORNEY

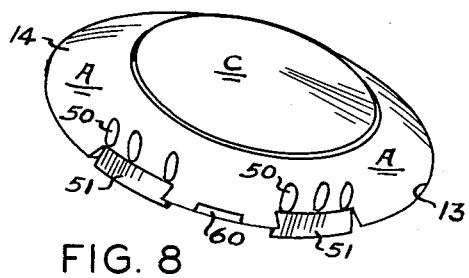
FIG. 8
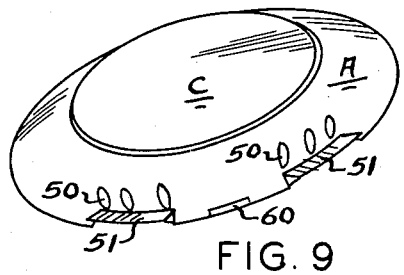
FIG. 9
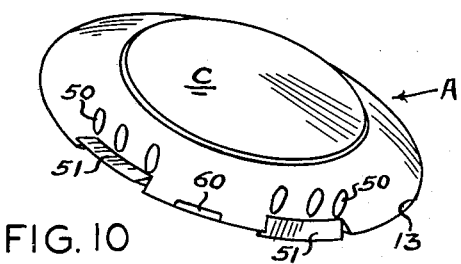
FIG. 10
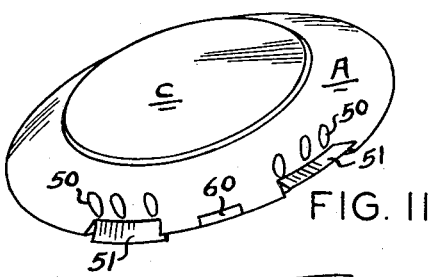
FIG. 11
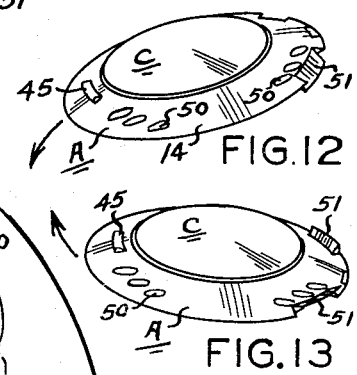
FIG. 12
FIG. 13
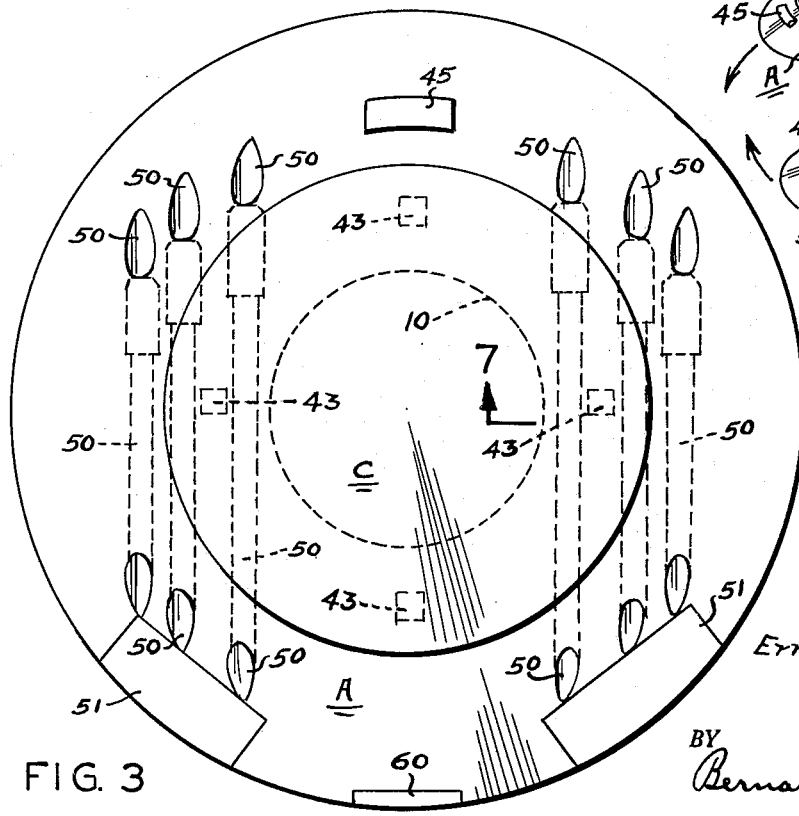
FIG. 3
Ernest L. Crabtree
INVENTOR,
BY
Bernard P. Miller
ATTORNEY.

Sept. 20, 1955    E. L. CRABTREE    2,718,364
FLUID SUSTAINED AND PROPELLED AIRCRAFT
HAVING ANNULAR SHAPED BODY
Filed July 30, 1953    3 Sheets-Sheet 3

Ernest L. Crabtree
INVENTOR,

BY
Bernard P. Miller
ATTORNEY

United States Patent Office 2,718,364
Patented Sept. 20, 1955

2,718,364

FLUID SUSTAINED AND PROPELLED AIRCRAFT HAVING ANNULAR SHAPED BODY

Ernest L. Crabtree, Midwest City, Okla.

Application July 30, 1953, Serial No. 371,324

6 Claims. (Cl. 244—12)

The invention relates to aircraft, and more particularly to aircraft commonly typed as "heavier than air."

The prime object of the invention is to provide a wingless "heavier than air," aircraft.

A further object is to provide an aircraft in which the fuselage is generally flat, and is annular in configuration.

Another object is to provide an aircraft of this type which has means for traveling vertically as well as laterally, and which is also provided with means for controlling the tilt thereof.

An additional object is to provide, in such an aircraft, a means for overcoming the normal tendency of the craft to rotate with its own propeller.

A still further object is to provide a "heavier than air" aircraft, which is so designed, that it may readily be powered by conventional jet propulsion apparatus.

Other objects will be apparent from the following description when taken in conjunction with the accompanying three sheets of drawings, wherein:

Figure 1 is a perspective view looking downwardly upon the device;

Figure 2 is an exploded perspective view illustrating the assembly of the principal elements of the aircraft;

Figure 3 is a top view;

Figure 8 is a perspective view looking downwardly upon the device, and showing the ailerons depressed;

Figure 9 is a view similar to Fig. 8, but showing the ailerons both raised;

Figure 10 is a view similar to Fig. 8, and showing one aileron raised and the other one lowered;

Figure 11 is a view similar to Fig. 10 showing the ailerons reversed;

Figure 12 is a perspective view looking at one side of the device shown in Fig. 8; and, Figure 13 is a similar view of the device shown in Fig. 9.

Like characters of reference designate like parts in those figures of the drawings in which they occur.

In the drawings:

Figure 4:
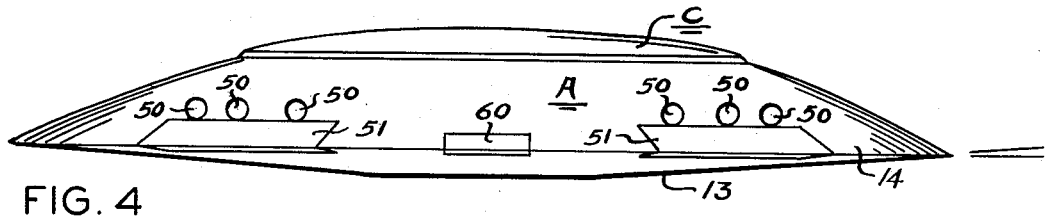
Figure 4 is an elevational view looking at the rear of the device.
Figure 5:
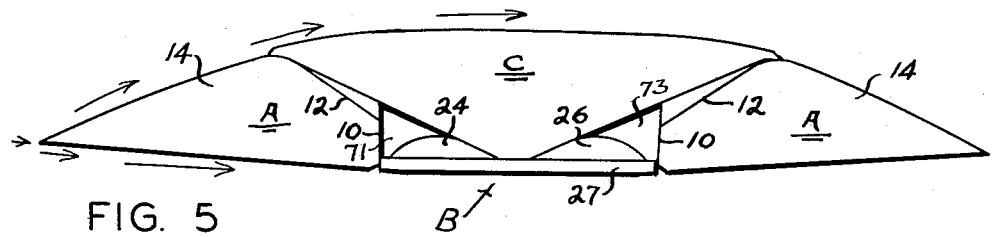
Figure 5 is a diagrammatic elevational view depicting air flow when the craft is in directional flight.

The reference character A indicates, as a whole, the fuselage of the device, the reference character B indicates, as a whole, the propeller of the device, and the reference character C indicates, as a whole, the principal air control element of the device.

The fuselage A is annular in general configuration having a round central aperture 10, bounded by a vertical annular wall 11. Immediately surrounding the vertical annular wall 11, there is provided an upwardly and outwardly tapered or slanting wall 12, which extends to the top of the fuselage. The fuselage is exteriorly bounded by a generally circular rim 13, and between the rim 13 and the upper edge of the wall 12, the surface of the fuselage is tapered downwardly and outwardly. This tapered surface is indicated, as a whole, by the reference character 14.

Figure 7:
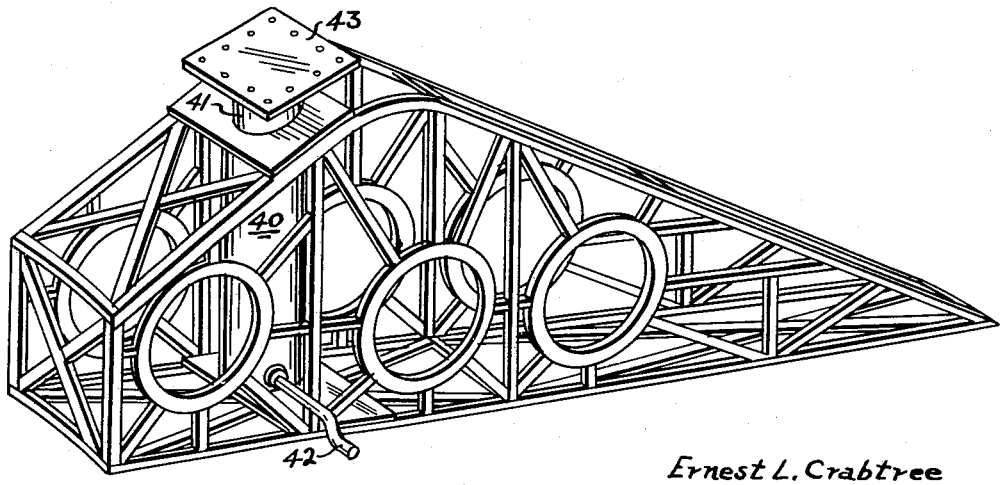
Figure 7 is a perspective view illustrating one manner of reinforcing or constructing the framework of the device.

Interiorly, the fuselage A is constructed of aluminum braces, struts, etc., which may assume the general form of construction as illustrated in Fig. 7 of the drawings. The particular manner of bracing the interior of the fuselage is not particularly pertinent to the present invention, so long as it has the desired strength.

As a means for controlling the flow of air through the aperture 10 of the fuselage A, the control element C is provided, the lower portion of which is generally conical in configuration. The depending conical portion of the element C is indicated, as a whole, by the reference numeral 20. Depending from the apex of the conical portion 20 is a rigid spindle or shaft 21.

The propeller element B is rotatably mounted on the shaft 21, and is held against vertical movement with relation thereto by any usual or conventional means, not shown.

The propeller element B consists substantially of a hub portion 22, which surrounds the shaft 21, a plurality of laterally extending blades 23, 24, 25, and 26, and a rigid ring 27, which surrounds and is integrally attached to the ends of said propeller blades. As means for rotatably driving the propeller B, the ring 27 is provided with jet propulsion tubes 28, 29, 30 and 31.

Figure 6:
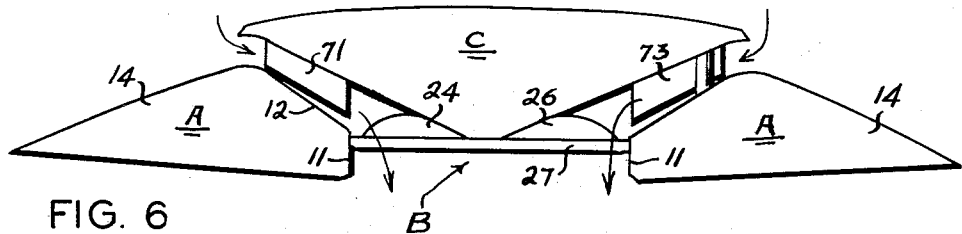
Figure 6 is a view similar to Fig. 5, but showing a control element in its raised position, and indicating air flow when the craft is in vertical motion.

As illustrated in Fig. 7, the fuselage is provided with a vertical ram housing 40, having a vertically movable ram 41 operatively housed therein; said housing 40 is adapted to receive a pressure fluid through a conduit 42, to forcibly raise the ram 41. Although not shown in the drawings, there are a plurality of these ram assemblies provided within the fuselage and they are located in radially spaced relation to the aperture 10 of the fuselage. The upper end of each ram 41 is provided with an anchoring plate 43, by which the ram is rigidly connected to the lower surface of the conical portion 20 of the element C, adjacent the upper portion of said conical surface. Consequently, the element C may be forcibly raised and lowered hydraulically, with relation to the fuselage A, and this may be done in a selective manner by controlling valve, not shown, in the pressure fluid supply line. When the element C is at the lower end of its travel, the propeller B is in position to rotate within the vertical walls 11 of the fuselage. When the element C is raised above the fuselage, as illustrated in Fig. 6, the propeller B lies at the upper end of the aperture 10. The blades of the propeller B are so arranged that they have a pitch which moves air downwardly through the aperture 10. It is thought to be apparent that rotation of the propeller B may cause sufficient downward movement of air through the aperture 10 to possibly raise the entire device, if the control element C is in a raised or partly raised position.

The upper surface of the fuselage A is provided with a suitable cabin 45 for housing the control instruments and passengers.

As means for driving the craft in a forward direction, the interior of the fuselage A is provided with two or more conventional jet type engines, not shown, having conventional jet tubes 50 which pass through the covering of the fuselage. In the embodiment illustrated in the accompanying drawings, jet tubes are shown to accommodate two of said jet engines.

As means for controlling the tilt of the fuselage A, when it is airborne, there are provided two or more conventional ailerons which are pivoted on horizontal axes, so that they may be swung upwardly or downwardly with relation to the rim 13 of the fuselage A. Such swinging movement of the ailerons is illustrated in Figs. 8 to 13 of the accompanying drawings.

A suitable trim tab 60 is also provided on the trailing edge of the fuselage A.

In order for the craft to be impelled vertically, the control element C is raised in the aperture 10 by the plural hydraulic rams 41, after which, or during the raising process, the propeller is placed in operation. As indicated by the arrows in Fig. 6, the propeller acts to draw air inwardly along the conical wall 12, and to exhaust such air downwardly through the aperture 10. Such a flow of air acts to bodily raise the craft, both through a partial vacuum created above the edges of the element C and over the upper edge of the wall 12, but also by the air-screw effect of the propeller. Since the propeller operates within the vertical annular wall 11, and is confined by said wall, the air exhausted by the propeller might well be termed as an air rocket.

It may readily be understood, that the air entering the aperture 10 would, under normal circumstances, travel a circular downward path, and the friction of such spinning air would normally have a tendency to cause the fuselage A to rotate. As a means for breaking up this circular or cylonic air travel, there is provided a plurality of rigidly mounted upstanding vanes 70, 71, 72 and 73. These vanes are mounted on the fuselage A in such a manner, that they project upwardly from the conical wall 12 thereof. Air must therefore enter the aperture 10 in a substantially straight lateral path. The depending conical portion 20 of the control element C is plurally slotted vertically so that the vanes 70, 71, 72 and 73 may enter the portion 20 when the element C is lowered.

It is thought that the function and manner of operating the ailerons 51 is obvious to anyone versed in the art of aeronautics.

It is pointed out that the accompanying drawings are to a large extent diagrammatic, and much has been omitted in structural detail. Such omitted details present only such problems as are readily solvable by those versed in the present art.

It is contemplated that during supersonic or exceptionally high directional speeds, with the element C closed, the propeller may be rotated in order to provide a gyroscopic influence on the craft.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A heavier than air aircraft, including: a horizontal annular body of rigid construction, having a central vertical through opening; an air control element mounted for vertical movement with relation to said body, said element so positioned that it may open and close said opening; a propeller carried by said control element and adapted to eject air downwardly through said opening; means for driving said propeller; and means for propelling said body through the air in a substantially horizontal path.

2. A heavier than air aircraft, including: a horizontal annular body of rigid construction, having a central vertical through opening; a conically flared wall surrounding the upper end of said opening; a downwardly and outwardly flared substantially conical surface surrounding the upper end of said wall; an air control element mounted on said body for vertical movement into and out of said opening; a depending exteriorly conical portion carried by said element and adapted to rest within said wall; hydraulic means for selectively raising and lowering said element with relation to the body; a propeller rotatably carried by the apex of said conical portion, said propeller rotatable within said opening; means for driving the propeller to rotation; and means for propelling said body through the air in a substantially horizontal path.

3. Structure as described in claim 1, in which said propeller driving means includes: jet propulsion tubes carried by the propeller.

4. Structure as described in claim 1, in which the body propelling means includes: jet propulsion tubes carried by the body.

5. Structure as described in claim 2, in which said propeller driving means includes: jet propulsion tubes carried by the propeller.

6. Structure as described in claim 2, in which the body propelling means includes: jet propulsion tubes carried by the body.

References Cited in the file of this patent

UNITED STATES PATENTS

| | | |
|---|---|---|
| 1,692,397 | Wagner | Nov. 20, 1928 |
| 1,797,669 | Oehmichen | Mar. 24, 1931 |
| 2,486,272 | Gazda | Oct. 25, 1949 |
| 2,567,392 | Naught | Sept. 11, 1951 |